United States Patent [19]

Kinkead

[11] Patent Number: 4,836,239
[45] Date of Patent: Jun. 6, 1989

[54] WATER COOLING TOWER AND WATER LEVEL CONTROL SYSTEM THEREFOR

[76] Inventor: Clifford W. Kinkead, 3801 W. Port Royal La., Phoenix, Ariz. 85023

[21] Appl. No.: 152,654

[22] Filed: Feb. 5, 1988

Related U.S. Application Data

[60] Continuation-in-part of Ser. No. 870,727, Jun. 4, 1986, Pat. No. 4,724,552, Division of Ser. No. 715,383, Mar. 25, 1985, Pat. No. 4,686,718.

[51] Int. Cl.⁴ ...................... F16K 31/34; F16K 33/00
[52] U.S. Cl. ...................... 137/413; 62/171; 62/305; 137/428; 137/429; 251/65; 261/109
[58] Field of Search .......................... 4/507, 508, 509; 62/171, 305; 137/412, 413, 418, 426, 428, 429, 445; 251/65; 261/109

[56] References Cited

U.S. PATENT DOCUMENTS

| | | | |
|---|---|---|---|
| 1,745,762 | 3/1930 | Honiss | 251/65 |
| 2,166,158 | 7/1939 | Kalischer | 62/305 |
| 2,448,251 | 8/1948 | Campbell | 137/429 |
| 2,739,939 | 3/1956 | Leslie | 137/428 |
| 2,966,330 | 12/1960 | Binford | 251/65 |
| 3,290,025 | 12/1966 | Engalitcheff, Jr. | 261/110 |
| 3,435,631 | 4/1969 | Wood, Jr. | 62/305 |
| 3,739,405 | 6/1973 | Schmidt | 137/428 |
| 4,438,635 | 3/1984 | McCoy, Jr. | 62/305 |
| 4,577,657 | 3/1986 | Alexander | 251/65 |

FOREIGN PATENT DOCUMENTS

| | | | |
|---|---|---|---|
| 0066977 | 9/1975 | Australia | 62/305 |
| 2326085 | 12/1974 | Fed. Rep. of Germany | 251/65 |

Primary Examiner—George L. Walton
Attorney, Agent, or Firm—Charles P. Padgett, Jr.

[57] ABSTRACT

The present invention discloses an apparatus for monitoring the level of a liquid such as water in a reservoir of a water cooling tower or the like wherein it is required to maintain a predetermined desired liquid level and for generating a first control signal for controlling the addition of make-up liquid to the reservoir and a second control signal for terminating the addition of liquid to the reservoir. The apparatus includes a float chamber having it bottom coupled to the reservoir for equalizing the water levels therebetween. A float is positioned within the float chamber for rising and falling with the level of monitored liquid therein. A float rod extends vertically upward from a central portion the float for movement therewith. A lever housing is fixedly secured in an intermediate position within the float chamber, and the lever housing pivotally mounts a lever member therein. The lever member has a long lever arm and a short lever arm. A first magnet having a first polarity is mounted to the distal end of the long lever arm for pivotal movement therewith while a second magnet having a second opposite magnetic polarity is mounted to that end of the lever housing adjacent the distal end of the long lever arm and the first and second magnets are oriented such that their magnetic fields repel one another when their axis are aligned.

31 Claims, 8 Drawing Sheets

WATER COOLING TOWER AND WATER LEVEL CONTROL SYSTEM THEREFOR

This Application, is a Continuation-in-Part of Application Ser. No. 870,727, filed on June 4, 1986 by Clifford W. Kinkead and David W. Kinkead for an APPARATUS FOR AUTOMATICALLY MAINTAINING A PREDETERMINED DESIRED LEVEL OF WATER IN A SWIMMING POOL AND THE LIKE, now U.S. Pat. No. 4,724,552, which, in turn, is a Division Application, of Ser. No. 715,383, filed on Mar. 25, 1985 by Clifford W. Kinkead and David W. Kinkead for a METHOD FOR AUTOMATICALLY MAINTAINING A PREDETERMINED DESIRED LEVEL OF WATER IN A SWIMMING POOL OR THE LIKE, now U.S. Pat. No. 4,686,718.

BACKGROUND OF THE INVENTION

1. Field of the Invention

The present invention relates generally to water cooling tower systems, and more particularly to a water level monitoring system for use with a water cooling towers and the like wherein the water level monitoring system controls the supply of make-up water to the reservoir of the water cooling tower.

2. Description of the Prior Art

Many different types of water cooling tower systems are known in the art. Similarly, many different types of heat exchangers, blowers, fans and the like are conventionally used in conjunction with such water cooling tower systems. Regardless of the particular construction of a specific water cooling tower, all have at least one thing in common.

All water cooling tower systems contain some type of reservoir or basin located in the bottom thereof for collecting the recirculated water. Since the recirculated water diminishes on each cycle due to the evaporation of the water which is responsible for the cooling action, additional make-up water must be added. The prior art uses various schemes for adding make-up water from a supply of water to the basin or reservoir of the cooling tower to compensate for the water lost in the evaporation process.

Relatively few of the prior attempts have used a float-type device and those that have, have encountered a relatively severe problem. If the reservoir is chosen to have a predetermined desired level of water in it at all times for maximum operating efficiency, a float can be used to determine when the water level has risen above or fallen below the predetermined desired water level. However, typical float mechanisms will tend to oscillate around the predetermined desired water level continually trying to add and then stop the supply of make-up water to the reservoir each time the sensor detects the water level on one side or the other. This causes maintenance problems, valve wear, system failure and the like. Some systems may attempt to use a float which trips a first switch when it rises to a level above the predetermined level of water and another switch when it falls a predetermined distance below. However, such systems tend to deteriorate quickly with time, mineral deposits on the switches, and the like. Further, however, the problem is actually doubled rather than solved since now the oscillation tends to take place on both sides of the upper and lower limit switches.

The present invention solves these problems of the prior art by providing an equivalent of a delay or an additional amount of force required to trip a trigger mechanism from a first position to a second position which is equivalent to the float having to rise a first predetermined distance above the predetermined desired water level or fall a second predetermined distance below the predetermined desired water level. In this manner, all oscillations are eliminated and a highly accurate indication of the actual water level can be made and used for control purposes.

SUMMARY OF THE INVENTION

It is an object of the present invention to provide an improved water cooling tower system having a water level monitoring system for controlling the supply of make-up water thereto.

It is another object of this invention to provide a water level monitoring system for controlling the supply of make-up water to a conventional water cooling tower system or the like.

It is a further object of the present invention to provide an improved water level monitoring system having a magnetic toggle means for preventing oscillations about a predetermined desired water level.

It is still another object of the present invention to provide an improved float assembly wherein the rising and falling of the float within the float chamber which has a water level equalized to the water level actually existing in the water cooling tower reservoir controls the positioning of a lever arm between a first magnetic toggle position and a second magnetic toggle position for controlling the operation of a hydraulic valve which supplies make-up water to the water cooling tower.

It is still a further object of this invention to provide an improved method of controlling the addition of make-up water to a water cooling tower system.

It is yet another object of the present invention to provide an improved water level monitoring system for controlling the addition of make-up water to a water cooling tower system.

It is yet a further object of the present invention to provide a magnetic toggle means responsive to the level of water in a float chamber for controlling the addition of make-up water to a cooling tower reservoir.

These and other objects and advantages of the present invention are implemented in an improved water cooling tower system including a water cooling tower structure having a top portion, a bottom portion, and an intermediate portion. A water-collecting basin or reservoir is operatively disposed in the bottom portion of the structure and a heat exchange means is operatively disposed in the intermediate portion of the structure. Means are provided for recirculating the collected water from the basin to the top of the structure and feeding the recirculated water, as by spray, mist, or the like into the top of the heat exchange medium. Means may be provided for moving or blowing air through the heat exchange means for absorbing heat by evaporating a portion of the water and cooling the non-evaporated water as known in the art. The cooled water may then be used for cooling machinery, air conditioning, or the like.

Since water is lost to evaporation, additional make-up water must be used to replenish the water in the basin. A signal responsive hydraulic valve is operatively coupled between a source of make-up water and an input to the basin of the water cooling tower. The valve is responsive to a first signal indicating that the water level has fallen at least a predetermined amount below the predetermined desired water level for opening the hydraulic valve to supply make-up water to the reservoir. The valve is further responsive to a second signal, the absence of the first signal, which closes the valve to terminate the addition of supply water to the reservoir.

The control signals are generated by the water level monitoring system which includes a float chamber housing a float. Means are provided for equalizing the water level in the float chamber with the actual water level existing in the basin. The system has a defined predetermined desired water level for optimum operation. The water level monitoring means serves the function of ensuring that the predetermined desired water level is maintained in the system. The float rises and falls with the water level in the float housing as an indication of the actual rise and fall of the level of the water in the reservoir. A float rod attached to the float rises and falls therewith. The float rod is used to pivot a lever member having a magnetic means on one end. A corresponding opposite polarity magnetic means is positioned adjacent the end of the lever arm having the magnet, and the two magnets are oriented for maximum repulsion. This causes the lever arm to have a first steady state or a first toggle state or position wherein it is positioned above the axis of the fixed magnet to indicate that the water level is high and a second steady state or toggle position below the fixed magnet to indicate that the float has fallen and make-up water needs to be added.

A contact member at the opposite end of the lever arm reacts to the position thereof for opening and closing a hydraulic valve to vent water from the make-up control valve. Therefore, when the float has fallen, indicating that water is to be added to the system, the lever having the magnet on its end wil delay moving downward from its second toggle position to the first steady state or toggle position until an additional force has been applied thereto sufficient to overcome the force of repulsion of the two magnets. This provides a delay which corresponds to a fall in the water level predetermined distance below the predetermined desired water level which the float must fall in order to provide the necessary force to overcome the repulsion and switch the lever to the first toggle position. This causes the short lever arm to rise and open the hydraulic valve to pass water from the control port of the make-up water supply valve thereby turning the supply valve on and adding make-up water to the reservoir.

Once the water rises a second predetermined distance above the predetermined desired water level, the force applied to the lever by the float rod will again be sufficient to overcome the force of magnetic repulsion and reposition the lever arm to the opposite toggle state or steady state position. In this position, the short lever arm is out of contact with the hydraulic valve activator thereby preventing the conduction of water from the make-up water control valve and turning it off to terminate the supply of make-up water to the reservoir.

The present invention contemplates an improved water cooling tower system having the water level monitoring system of the present invention; an improved water level monitoring system for use in water cooling towers and the like; and an improved float assembly using magnetic means for generating control signals. It further contemplates a method of controlling the addition of make-up water to a water cooling tower; a method of monitoring the level of water in the basin of a cooling tower and generating control signals in response thereto; and a method generating control signals in response to a magnetic toggle arm operated by a float which monitors the water level in the water cooling tower basin.

These and other objects and advantages of the present invention will be more fully understood after reading the detailed description of the preferred embodiment, the claims, and the drawings, which are briefly described hereinbelow.

DETAILED DESCRIPTION OF THE PREFERRED EMBODIMENT

Figure 1:
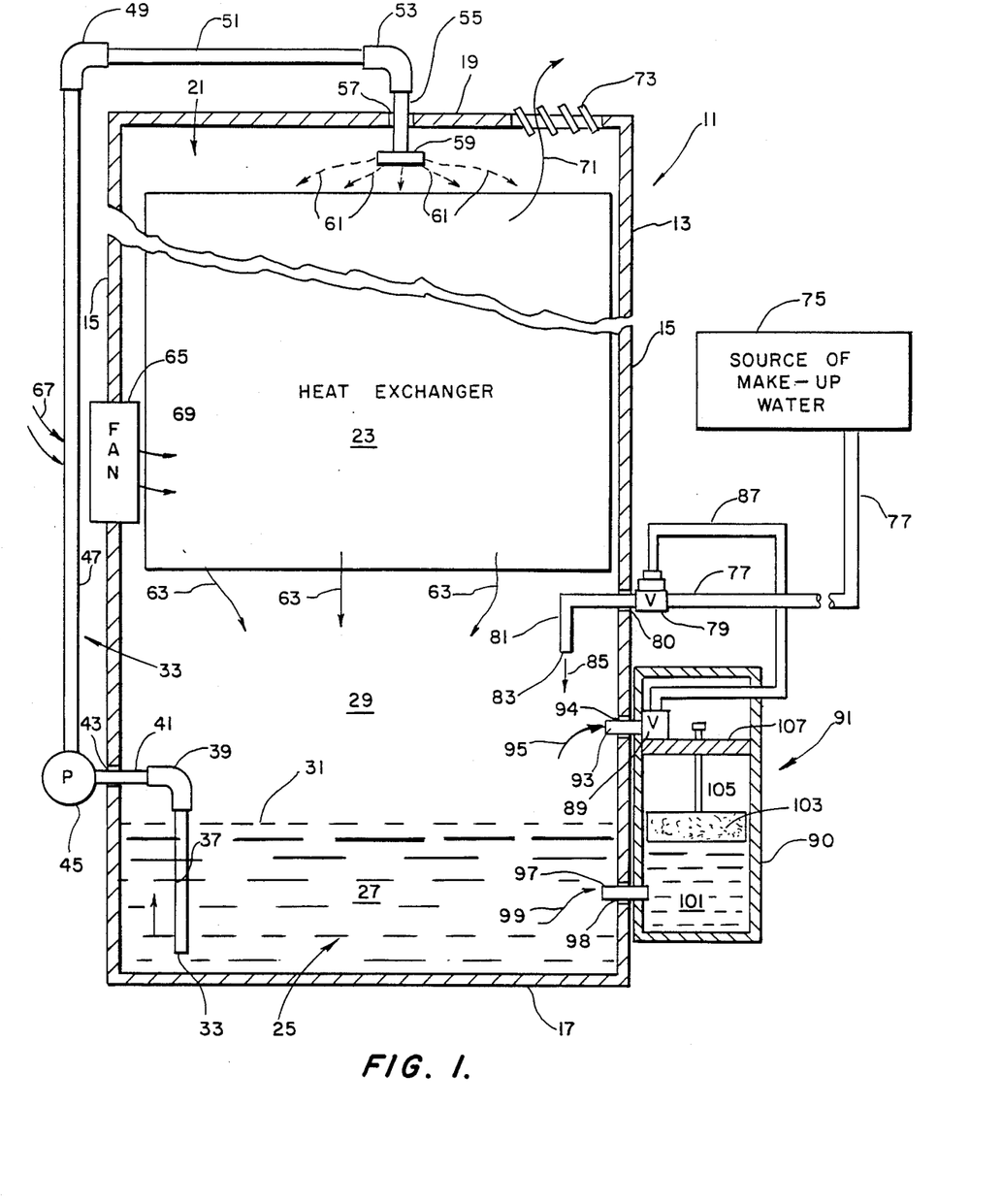
FIG. 1 is a schematic illustration of a conventional water cooling tower system provided with the water level monitoring and control system of the present invention.

In FIG. 1, a conventional water cooling tower system 11 is shown as having a water cooling tower structure 13 which includes side walls 15, a closed bottom 17, and a top 19. The side walls 15, bottom 17, and top 19 enclose a substantially hollow interior 21 in which any type of conventional heat exchanger 23 may be housed. The water cooling tower 11 includes a water-collecting reservoir or basin 25 which stores water 27. An air space 29 exists above the water level 31 of the collected water 27 in the basin 25, and this water level 31 is referred to as a predetermined desired water level.

The water cooling tower system 11 of FIG. 1 includes a recirculation system 33 which includes a pipe or conduit 37 having an inlet 35 for drawing the collected water from the reservoir 25 into the pipe or conduit 37 via the action of a recirculation pump 45. The pipe 37 is connected by an elbow joint 39 to a recirculation outlet pipe 41 which passes through an aperture 43 in the wall 15 and is connected to the pump inlet of the recirculation water pump 45. The outlet of the pump 45 is connected to one end of a pipe or conduit 47 which, in turn, is connected, via elbow joint 49, conduit 51, elbow joint 53, and water inlet pipe 55 to a sprinkler head 59. The inlet pipe 55 passes through an aperture 57 in the top 19 of the water cooling tower structure 13. The sprinkler 59 represents a typical one of such conventional devices for sprinkling or otherwise dispensing a spray or mist of recirculated water 61 down into the top of the heat exchanger 23 for passage therethrough as indicated by the arrows 63.

A fan or blower 65 may be used to supply air from the atmosphere 67 into the heat exchanger 23, as represented by flow directional arrows 69. The air 69 passes through the heat exchanger 23, for example, in a counter-flow or cross-flow manner, and exits as exhaust air 71 through the outlet vent 73 in the top 19 of the water cooling tower structure 13.

A source of make-up water or replacement water 75 is shown as being connected through a make-up water pipe 77 to the input of a hydraulic valve 79 whose output is connected through an aperture 80 in the wall 15 of the water cooling tower structure 13 as make-up water inlet pipe 81. The make-up water passes from the inlet conduit 81 out the aperture or outlet 83, as indicated by the directional flow arrow 85 and replenishes the collected water 27 in the water-collecting basin or reservoir 25 to restore the water lost by the evaporation process and the like.

A control outlet of the hydraulic valve 79 is connected via a tube or conduit 87 to a hydraulic valve 89 contained within the water level monitoring system 91 of FIG. 1.

The water level monitoring system 91 includes a float chamber or housing 90 which receives water 101 via inlet tube 97 passing through the aperture 98 of the wall 15 from the collected water 27, as indicated by the directional flow arrow 99. The free passage of water 99 through the inlet 97 into and out of the bottom portion of the float chamber 90 insures that the monitored level of water in the float housing 90 is always equal to the actual level of water existing in the reservoir or basin 25. The float housing 90 also includes an air inlet pipe or conduit 93 passing through an aperture 94 in the wall 15 for receiving atmospheric air 95 from the space 29 above the collected water 27 and passing it through the conduit 93, as indicated by the flow direction arrow 95, into the air space above the water 101 in the float chamber 90. Lastly, the float chamber 90 houses a float member 103 having a vertically-oriented float rod 105 coupled to a lever assembly 107, as hereinafter described.

It will be understood that the purpose of a conventional water cooling tower system is to remove BTU's (heat) from a circulating water supply that has been used to cool some type of equipment, to cool air, or the like. A recirculating water pump 45 circulates water 27 from the reservoir 25 and sprays it down over a heat exchanger 23, as indicated by the flow direction arrows 61 emanating from the sprinkler head structure 59. The recirculating water removes BTU's or heat from the hot surfaces from the heat exchanger 23, as known in the art. A fan 65 may be used to force air through the cooling tower structure 13 where the air contacts the heated water passing through the heat exchanger 23 and removes heat therefrom. The water transfers the heat to the air in the form of evaporated water, and the evaporated water and moisture-laden humid air exits the cooling tower as exhaust air 71 via vents 73. The evaporation process cools the remaining air that now falls downwardly as indicated by arrows 63, into the recirculating water 27 of the reservoir 25. From here the circulating pump 45 again pumps the water to start the cooling cycle again. The formula for calculating the evaporation in gallons per minute is: "the evaporation is equal to the water recirculation in gallons per minute times the temperature difference existing between the water before picking up heat and the water after picking up heat times a constant 0.001.

The humid air in the water vapor passes out of the tower system thereby removing BTU's or heat therefrom. The water that has fallen back into the basin 25 is again recirculated, but now there is less water in the system. Additional water or make-up water must be added to the tower to replace the evaporated water.

The system of FIG. 1 provides an improved water level monitoring system and apparatus for controlling the addition of make-up water to the reservoir to replenish the water lost by the evaporation process.

Figures 2, 3:
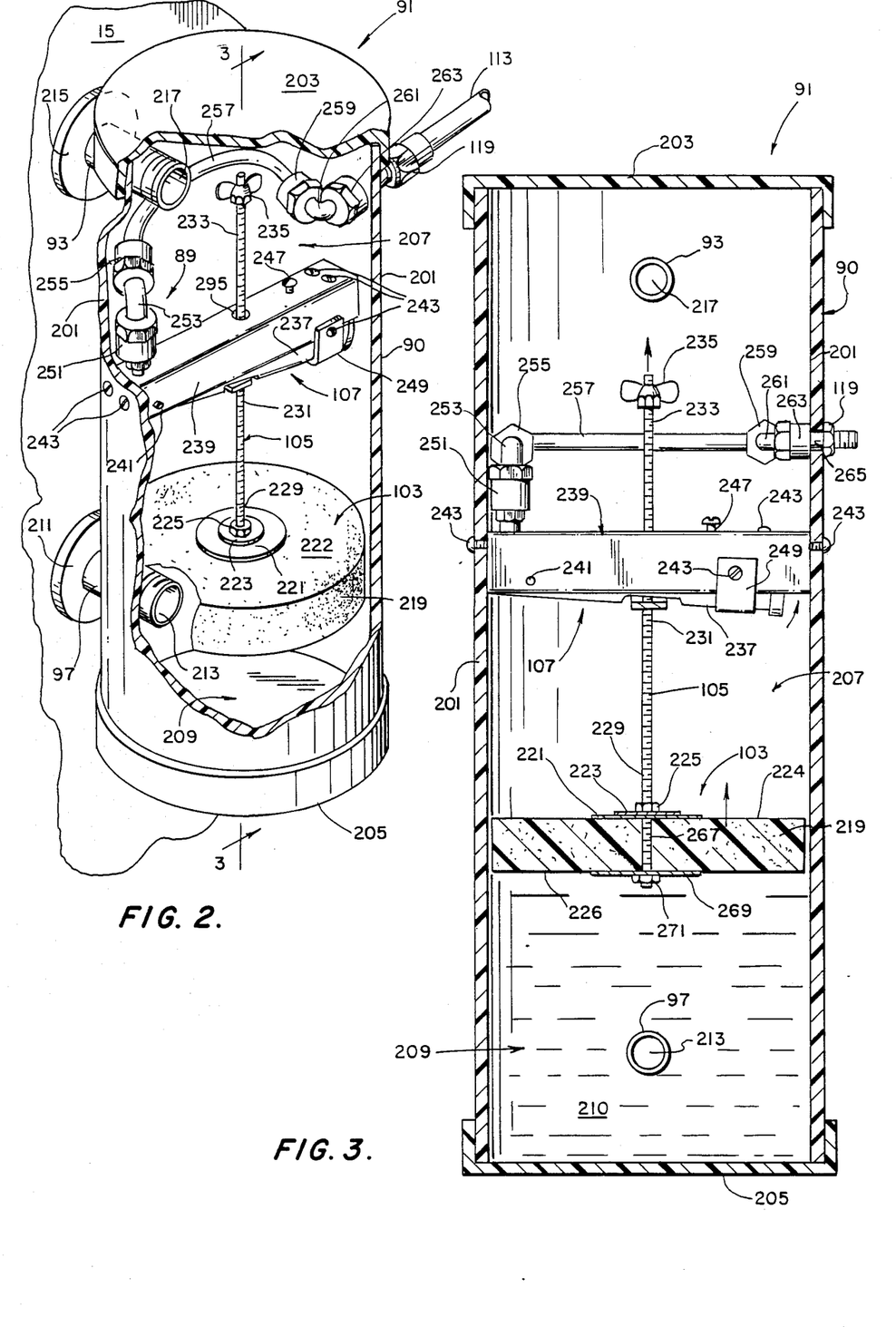
FIG. 2 is a respective view, partial in section, of the water level monitoring system of the present invention.
FIG. 3 is a sectional side view of the float assembly of FIG. 2.

FIG. 2 illustrates the water level monitoring system 91 of FIG. 1. The water level monitoring system 91 includes a float housing or float chamber 90, indicated in FIG. 2 as a hollow right cylinder having cylindrical sides or walls 201, a closed bottom 203, a closed top 205, and a substantially hollow interior 207. The lower portion of the hollow interior forms the monitored water-containing portion 209. A mounting bracket 211 is connected to the wall 15 of the water cooling tower structure 13 for connecting the water inlet conduit 97 to the water collecting reservoir 25 of the water cooling tower structure 13 and, via inlet/outlet 213, to the water-collecting portion 209 of the float chamber 90. The inlet conduit 97 is referred to herein as an equalization water inlet/outlet conduit since the water is capable of flowing back and forth therethrough to equalize the water level between the water level actually existing in the reservoir 25 and the corresponding monitored water level existing within the bottom portion 209 of the float housing 90.

A second mounting bracket 215 connects the air equalization inlet 217 to the air space 29 above the collected water 27 in the water cooling tower structure 13 of FIG. 1, via conduit 93. With the air pressure equalized, and the water level able to reach equilibrium, it is certain that the monitored water level within the float chamber 90 is always the same as and indicative of the actual water level existing in the water collecting reservoir 25.

The float chamber 90 is also shown as housing the float assembly 103 of FIG. 1. The float assembly 103 includes a relatively circular, disk-shaped float body or member 219 having the configuration of a relatively short right cylinder. The outer peripheral edge or surface 220 of the float member 219 is operably disposed a relatively short predetermined distance away from the interior surface 224 of the walls or sides 201 of the cylindrical housing 90. That is, the diameter of the float member 219 is slightly less than the inside diameter of the float housing 90. A relatively large washer 221 is disposed upon the flat upper surface 222 of the float member 219 over a central portion thereof. A smaller washer 223 is then disposed over a central portion of the large washer 221 and a nut-like member 225 is internally threaded onto the lower end portion 229 of the float rod 105 to clamp the washers 221, 223 against the top surface 222 of the float body 219. Similar connecting apparatus on the lower or opposite surface 226 of the float member 219 insures that the float member 219 is clamped between the upper and lower washers in a sandwich-type manner. This insures that the vertically oriented float rod 105 moves reciprically up and down along the central longitudinal axis of the hollow cylinder 90 as the float rises and falls with changing monitored water level.

The upright float rod 105 also includes a top end portion 233 and an intermediate end portion 231. A wing nut or similar shaft-turning means 235 which is ridgedly secured to the top end portion 233 of the float rod 105 adjacent the distal end thereof to enable the user to manually turn the externally-threaded rod 105 to selectively adjust or vary the distance between the float body or member 219 and a portion of the lever assembly 107 to which the float rod 105 is coupled.

A lever member 237 is shown as being operatively housed within a lever housing 239 and mounted therein via pivot pin 241 for pivotal movement, as conventionally known. Threaded fasteners, such as conventional threaded screws or bolts 243, are used to fixedly secure or mount the lever housing 239 to the cylindrical walls 201 of the housing 90. A central aperture 245 is operatively disposed through the lever housing 239 such that the intermediate portion 231 of the externally-threaded float rod 105 passes therethrough. An up-motion position limiting apparatus or threaded member 247 is oepratively disposed through a threaded aperture in the top of the lever housing 239 to limit the upward movement of the lever 237 while a down-motion position limiting apparatus or L-shaped member 249 is fastened to the lever housing 239 via fastener 243.

A hydraulic valve assembly 89, includes a control signal generating valve 251 whose operation will be described hereinafter with reference to FIGS. 6 and 7. A curved conduit or tube 253 connects the input of the hydraulic valve 251 to a coupler or tube connector 255 which in turn is connected to one end of a generally semicircular tube or conduit 257 whose opposite end is connected through a coupler or connector 259 to a curved tube portion 261 and then to a coupler 263 which is, in turn, coupled to one end of an inlet conduit 265 which passes through an aperture, not shown, in the wall 201 of the cylindrical float housing 90 and has its opposite end connected through a connector or coupler 119 to the hydraulic signal conduit or tube 113, as previously described.

FIG. 3 is a cross-sectional side view, taken along view lines 3—3 of FIG. 2, and shows, in greater detail, the construction of the float assembly 103 of FIG. 2. In FIG. 3, similar parts are designated by similar reference numbers and will not be repeated in this description. In FIG. 3, the fit of the top lid or cover portion 203 over the upper opening of the cylindrical chamber 90 is shown in greater detail as is the fit of the lower cap or closure portion 205 over the lower end of the cylindrical float chamber 90. Furthermore, the lower portion 209 of the float housing 90 is shown as being filled with water 210 which supports the float member 219 and therefore controls the positioning of the float rod assembly 105. In FIG. 3, the lower end portion 229 of the externally-threaded float rod 105 is shown as including an end portion 267 passing through the axial center of the float body 219 and exits through the central aperture of a relatively large washer 269 which is secured adjacent the lower distal end of the rod 105 by a nut-like threaded member 271, thereby securing the float body 219 between the upper washer 221 and the lower washer 269 in a sandwich-type manner and ensuring that the rod 105 reciprocally rises and falls along the longitudinal axis of float chamber 90 as the float body 219 rises and falls along with changes in the level of the monitored water 210 within the bottom chamber portion 209.

Figure 4:
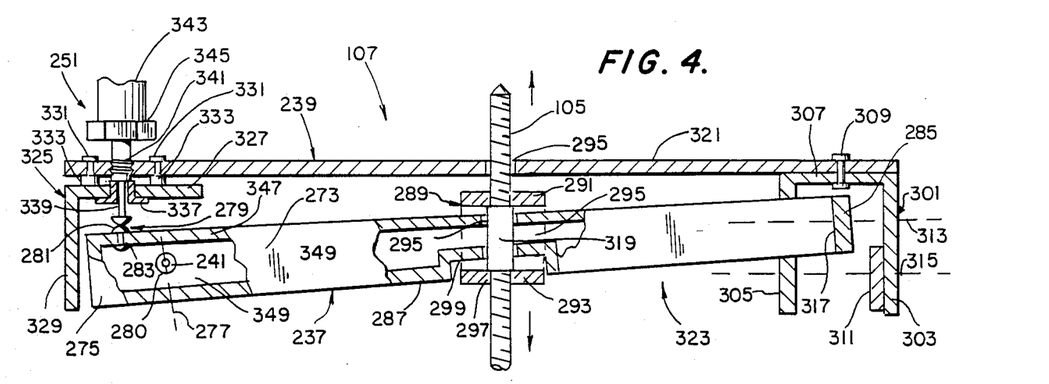
FIG. 4 is a side view, partially in section, of the lever assembly apparatus used in the float system of FIGS. 2 and 3.

FIG. 4 shows a side view, partially in section, of the lever assembly 107 of FIG. 1. In FIG. 4, the lever assembly 107 is shown as including a lever housing 239 and a lever member 237. The lever member 237 includes a relatively long lever arm 273 on one side of the pivot pin 241 and a relatively short lever arm 275 on the opposite side of the pivot pin 241. The junction of the long lever arm 273 with the short lever arm 275 occurs at the pivot pin 241 which attaches the lever member 237 to the lever housing 239. The short lever arm 275 is shown as including a contact member 279 on the top surface thereof. A pivot bushing or sleeve 280 mounts the pivot pin 241 for rotation therein through the junction of the lever arm and is journaled into the sides (not shown) of the lever housing 239. The contact member 279 includes a contact head portion 281 and a stem portion 283 extending through the upper member 347 of the short lever arm 275 for mounting same.

A first permanent magnet 285 having a first magnetic plurality is operatively mounted to the distal end 317 of the long lever arm 273. An intermediate portion 287 of the long lever arm 273 is coupled to a relatively squared, C-shaped lever-moving member 289 having a generally horizontal top pull-down portion 291, a generally horizontal bottom push-up member 293, and a vertical member 295 interconnecting corresponding ends of the pull-down and push-up member 291 and 293, respectively. A central portion of the pull-down top member 291 is provided with a first threaded aperture 296 which is aligned with a corresponding bottom threaded aperture 297 in the push-up lower member 293. The externally-threaded intermediate portion 231 of the vertically-oriented float rod assembly 105 threadedly engages the top and bottom threaded apertures of the pull-down and push-up members 291, 293, respectively, as it passes through the intermediate portion 287 of the long lever arm 273. The lower intermediate portion 287 of the long lever arm 273 may be provided with a slot cut-out portion or indentation 299 for receivably engaging the push-up member 293.

An inverted, generally-squared, U-shaped magnet housing assembly 301 includes a first downwardly disposed leg 303, a second downwardly disposed leg 305, which is generally parallel to and spaced a predetermined distance apart from the first downwardly disposed leg 303. The legs 303 and 305 are joined at one end by a horizontally-connecting top member 307. A rivet connection 309 fixedly secures the inverted U-shaped end portion 301 within one end of the lever housing 107. A second permanent magnet 311 having a plurality opposite to that of the first magnet 285 is fixedly mounted on the interior surface of the downwardly disposed leg 303. The magnet 311 has a magnetic axis 315 while the first permanent magnet 285 has a magnetic axis 313 along the longitudinal axis of the lever member 237. The axis 315 is adapted to move as the long lever arm 273 pivots the magnet 285 mounted on the distal end 317 thereof while the permanent fixed magnetic axis 315 is stationary. The magnets 285 and 311 are oriented such that their magnetic fields repel one another such that substantial additional force is required to move the distal end the long lever arm 273 mounting the first magnet 285 into alignment with the magnet axis 315 of the second permanent magnet 311 from either the raised position passing downward or the lower position passing upward. The purpose of this feature will be described hereinafter.

A spacer sleeve 319 is operatively disposed between the top and bottom members 291 and 293 and the intermediate portion 287 of the long lever arm 273 passes therethrough so that the externally-threaded float rod 105 does not itself engage any portion of the lever arm 273 but is attached to the C-shaped lever-moving member 289 for contacting the lower surface of the long lever arm 273 by the push-up member 293 for raising the long lever arm 273 and for contacting the upper surface of the top of the long lever arm 273 for pushing down the long lever arm by the push-down member 291, as previously described.

The lever housing 239 includes a generally horizontally disposed top 321, a pair of sides, not shown in FIG. 4, and an open bottom 323. An inverted L-shaped member 325 has a horizontal leg 327 and a vertically-depending leg 329. Fasteners 331 pass through the top of the lever housing 239 and into sleeves 333. An aperture 335 through the central portion of the collar sleeve 337 houses a vertically-reciprocating moveable pin member or push rod 339 for use as hereinafter described with reference to FIG. 6 and 7. The hydraulic valve 251 includes a lower stem portion 341 and an upper stem portion 343 separated by a nut-like annular member 345.

The lever member 237 includes a generally elongated top 347, a pair of oppositely spaced distending elongated sides 349 and a hollow or open bottom 350 thus giving the lever member 237 a generally squared, inverted, U-shaped cross section.

Figure 5:
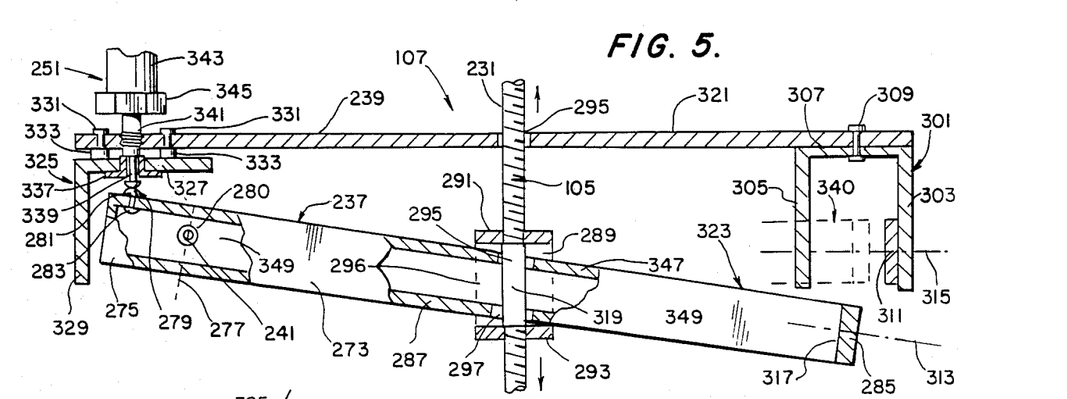
FIG. 5 is a side view, partially in section, of the lever assembly of FIG. 4 with the lever arm depicted in the opposite steady state position.

FIG. 5 is a side view, partially in section, of the lever assembly 107 of FIG. 4. In FIG. 4, the long lever arm 273 was positioned in a first toggle position or a first steady-state position wherein the axis 313 of magnetic alignment of the permanent magnet 285 is above the magnetic axis 315 of the second permanent magnet 311. FIG. 5 shows the long lever arm 273 in the opposite position wherein the magnetic axis of alignment 313 of the permanent magnet 285 is positioned below the axis 315 of the permanent magnet 311 in what is defined as the second toggle position or the second steady state position. In order to position the long lever arm 273 from the first toggle position of FIG. 4 to the second toggle position of FIG. 5, the float must drop as the water level falls so that the pull-down member 291 contacts the top surface of the long lever arm 273 and pulls it through the position of magnetic alignment wherein the axis 313 of magnetic 285 and axis 315 of magnetic 311 are aligned for maximum magnetic repulsion. Therefore, even though the float falls with the level of monitored water to achieve the predetermined desired water level within the reservoir of the water cooling tower, additional force is required to switch or pull the lever arm 273 past the point of magnetic alignment and into the lower toggle position as shown in FIG. 5. This additional force can be thought of as requiring that the float fall a first predetermined distance below the predetermined desired water level in order to switch or toggle the lever arm. This provides a delay to prevent oscillations about the predetermined desired water level every time the float rises a small amount or falls a small amount, since the lever arm will only toggle when the float rises or falls a predetermined distance above or below the predetermined desired water level.

Figure 6:
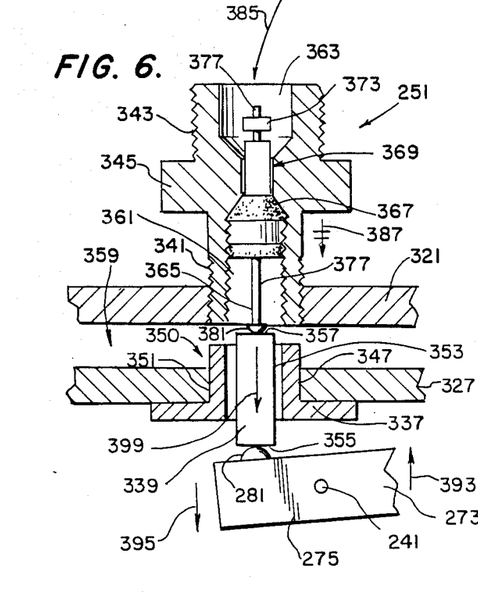
FIG. 6 is a side view, partially in section, of the hydraulic signal-generating valve and related apparatus of FIGS. 4 and 5 illustrating the valve in the closed position.
Figure 7:
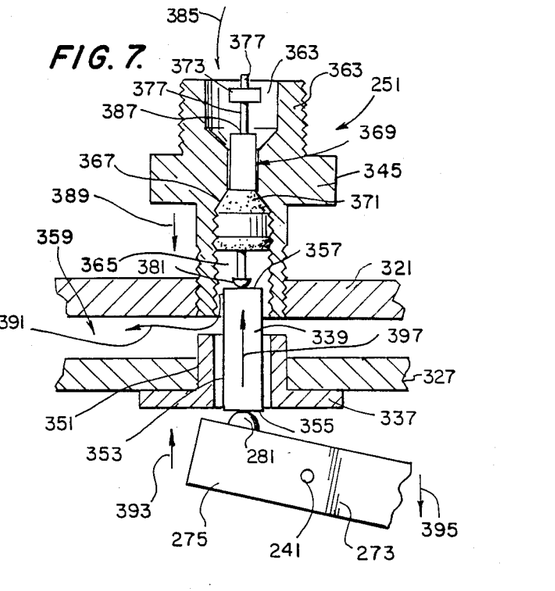
FIG. 7 is a side view, partially in section, of the hydraulic signal-generating valve of FIG. 6 illustrating the valve in the open position.

FIGS. 6 and 7 illustrate, in greater detail, the operation of the hydraulic valve 251 of FIGS. 4 and 5. In FIG. 6, a partial cross-sectional side view of the valve 251 is shown. As previously described, the valve 251 includes a lower stem portion 341 which is internally and externally threaded, an upper stem portion 343 which is externally threaded, and a nut-like annular member 345 disposed therebetween.

A top horizontal leg 327 of the L-shaped member 325 includes an aperture 347 therethrough. A collar or sleeve member 350 is fixedly mounted within the aperture 347 and includes a vertically oriented cylindrical sleeve portion 351 having a hollow interior 353 and a horizontal collar portion 337 which extends along and bears against the lower surface 326 of the top 327. A generally cylindrical, elongated shaft or rod 339 is freely positioned within the hollow interior channel 353 of the sleeve 350 for vertical up and down movement along the longitudinal axis of the cylindrical portion 351. The downwardly directed arrow 399 of FIG. 6 indicates that rod 339 is in its "down" position since the short lever arm 275 is in its "down" position, as indicated by the directional arrow 395, while the long lever arm 273 is in its "up" position, as indicated by the directional arrow 393. Furthermore, FIG. 6 shows the bottom contact surface 355 of the push rod member 339 being operatively disposed on and supported and carried by the top of the contact member 281 which is mounted on the top surface of the short lever arm 275, as previously described.

The upper contact end 257 of the push rod 239 is disposed a predetermined distance 359 away from the contact end 381 of the pin member 377. A generally elongated hollow channel or passage 361 extends through the hollow interior of the hydraulic valve 251. The channel includes an inlet portion 363, an outlet portion 365 and an intermediate portion 366. The intermediate portion 366 includes a narrow interconnecting neck portion 367 connected by internally-disposed tapered surfaces to the outlet portion 365. A substantially hollow plug member 371 is externally-threaded into the hollow interior of the outlet portion 365 until the resilient tapered surfaces of the plug 371 contact the corresponding tapered surfaces of the internal channel 361 at the neck portion 367 to form a permanent seal thereat. A reciprocating pin member having a lower end portion 377 includes an intermediate portion, not shown, passing through the hollow central portion 387 of the plug member 371, and an upper end portion 377 which connects to an annular seal 373 and then to an extension of the pin 377 thereabove. The pin 377 is internally spring-biased out of the bottom of the seal plug 371 to position the contact end 381 as shown in FIG. 6. In this configuration, the annular seal 373 seats to seal the hollow elongated central passage through the seal plug 371 to prevent the passage of water therethrough. The lower end portion 377 of the pin has its bottom ended terminating in the contact member 381 as previously described. The arrow 387 indicates that the water or liquid can not pass from the input cavity 363 to the output cavity 365 since the hollow longitudinal passage 387 through the plug member 371 is closed by the seated member 373.

FIG. 7 illustrates the hydraulic valve 251 when the long lever arm 273 toggles from the first toggle position wherein its longitudinal axis is above the magnetic axis 315 of the magnet 311 to the second toggle position wherein its longitudinal axis is positioned below the magnetic axis 315 of the magnet 311. In FIG. 7, similar parts are designated by similar reference numerals and the description will not be repeated. In FIG. 7, as water and float fall, the long lever arm 273 is pulled down by the contact member 291. It toggles past the position of magnetic alignment and achieves the second toggle position or second steady state position wherein the distal end 317 of the long lever arm 273 is low while the short lever arm 275 is high as it is oriented about the pivot pin 241. The high position or raised position of the short lever arm 275 causes the contact member 281 to engage the lower contact surface 355 of the shaft 339 causing the shaft to be pushed vertically upward in the channel 353, as indicated by the directional arrow 397 within the hollow interior 353 of the collar member 350. When the shaft 339 is raised, the upper contact surface 357 at the opposite upper end of the push rod 339 engages the contact member 381 at the lower distal end of the pin 377 and causes the pin to be raised against the bias of the internally-mounted spring thereby raising the pin 377 and unseating the seal member 373 from its seated position above the input of the central plug channel 387 thereby enabling the liquid within the inlet 363 to enter the plug channel 387 and flow through the hollow interior of the plug 369 to exit as illustrated by the directional arrow 391. Directional arrow 393 indicates that the short lever arm 275 is in the raised position while the long lever arm 273 is in the lower position as indicated by directional arrow 395. Arrow 389 indicates that the liquid can flow through the hollow interior passage 387 of the plug member 369 thereby generating an appropriate signal for operating the hydraulically-operated make-up water valve 79 of the system of FIG. 1.

In operation, the system of the present invention relates to an improved water cooling tower having a water level monitoring system for controlling the input of make-up water to the reservoir. The supply of make-up water is controlled by a hydraulically-actuated valve responsive to a first hydraulic signal or control signal, indicating that the water level has fallen at least a first given or predetermined distance below a predetermined desired water level, for actuating the make-up valve to pass the make-up water from a source of water to the reservoir 25 at the base of the water cooling tower. Similarly, the hydraulic valve is responsive to the generation of a second hydraulic signal or control signal (such as the absence of the first control signal) indicating that the water level has risen at least a second predetermined distance above the predetermined desired water level for turning off the supply of make-up water to the reservoir.

The generation of the control signal is controlled by the rising and falling of a float member within a float chamber. The level of water in the float chamber is equalized to the level of water in the reservoir of the water cooling tower and the float raises and lowers its position within the float housing as the water level raises and lowers in the cooling tower reservoir to reciprocally raise and lower a vertically-oriented float rod 105 which operates a lever pivotally mounted within a lever housing fixedly connected within the float chamber. As the rod raises the float, indicating that the water level is rising, a push up member secured thereto will lift the lever arm to a second toggle position and when the float falls, a push down member attached to the rod will lower the lever to a first toggle position. When the lever is in the second toggle position, the contact on the short end of the lever arm does not engage the pin for opening the float chamber valve which generates the control signal for operating the hydraulic make-up water valve. Whenever the long lever arm is pulled down, indicating that the water level is falling, as soon as it stabilizes in the first toggle position, a contact on the short arm of the lever will open a seal in the valve and pass water from the control input of the hydraulic make-up water valve therethrough. This represents the first control signal for turning on the valve to add make-up water. Similarly, when the float rises, the push up member engages the long lever arm causing the short lever arm to disengage contact and close the valve within the float chamber. When the valve is closed, the generated signal indicative thereof maintains or is referred to as the second control signal and maintains the make-up water valve closed. Therefor, whenever the water level has fallen at least a first predetermined distance below a predetermined desired water level, the lever arm toggles to one position to control the operation of the hydraulic make-up water valve and add water to the reservoir of the water cooling tower whereas when the water rises, the float rises, and causes the lever arm to switch to a second toggle position wherein a second control signal is generated which maintains the hydraulic make-up water valve closed to prevent or terminate the addition of make-up water to the reservoir.

It will be understood by those of ordinary skill in the art that the water cooling tower system 11 may include any type or construction of water cooling tower and not only that shown in FIG. 1. Similarly, the fan or blower, the heat exchanger, the pump, and the like can be substituted for their equivalents at will. The present invention relates generally to the combination of any water cooling tower construction or the like with applicant's water level monitoring and make-up water control system.

It will, therefore, be obvious to those of ordinary skill in the art that various modifications, changes, variations, alterations, substitutions and the like can be made in the present invention without departing from the spirit and scope thereof which is limited only by the appended claims.

What is claimed is:

1. An improved water cooling tower system including a water cooling tower structure having a top portion, a bottom portion, an intermediate portion therebetween, a water-collecting basin operatively disposed in said bottom portion of said structure, a heat exchange means operatively disposed in the intermediate portion of said structure, means for recirculating the water from said water-collecting basin to the top portion of said structure and feeding the recirculated water into the top of said heat exchange means, means for moving air through said heat exchange means drawing heat from said water for evaporating a portion of said water while cooling the non-evaporated water, means for utilizing the cooled water for at least one of air-conditioning and water-cooling purposes, conduit means operatively coupling a source of fresh water to said water-collecting basin for restoring the water lost in the evaporation process, said conduit means including a signal-responsive hydraulic valve means operatively coupled therein, said hydraulic valve means including a water inlet, a water outlet, a control port, and means responsive to the control signals at said control port for opening and closing said hydraulic valve means, said hydraulic valve means being responsive to an "ADD WATER" control signal for passing said fresh make-up water through said fresh water conduit to said water-collecting basin and being further responsive to a "DON'T ADD" control signal for preventing the passage of fresh make-up water through said conduit means, the water in said water-collecting basin having a predetermined desired water level, the improvement comprising:

a float chamber assembly operatively coupled to the exterior of said water-collecting basin, said float chamber assembly having a float chamber, an air conduit operatively coupled to an air space above said water-collecting basin, and a water conduit operatively coupled to said basin a given distance below said predetermined desired water level;

a float means operatively disposed within said float chamber between said air conduit and said water conduit for monitoring the water level in said float chamber as a measure of the actual water level in said water-collecting basin of said water cooling tower structure; and air valve means including an air signal conduit operatively coupled between said air valve means and said control port of said hydraulic valve means, said air valve means responsive to the position of said float means within said float chamber for generating and transmitting said "ADD WATER" signal to said hydraulic valve means via said air signal conduit whenever said monitored water level is a first predetermined distance below said predetermined desired water level and for continuing to generate and transmit said "ADD WATER" signal until said monitored water level is a second predetermined distance above said predetermined desired water level, said air valve means responsive to the position of said float means within said float chamber for terminating said "ADD WATER" signal by generating and transmitting said "DON'T ADD" signal to said hydraulic valve means via said air signal conduit whenever the monitored water level has risen to a water level a second predetermined distance above said predetermined desired water level and for continuing to generate said "DON'T ADD" signal until said monitored water level has again fallen a first predetermined distance below said predetermined desired water level, the changing of said generated signals at said predetermined distances above and below said predetermined desired water level preventing oscillations back and forth in the operation of said hydraulic valve means.

2. The improved water cooling tower system of claim 1 wherein said float means includes a float member and a generally vertically-oriented float rod operatively connected to a central portion of said float member for up and down reciprical movement therewith along the longitudinal axis of said float chamber.

3. The improved water cooling tower system of claim 2 wherein said float chamber includes a right cylindrical shell member having a hollow interior, means for closing the top and bottom of said float chamber, said float member including a right cylindrical disk having a top and bottom circular surface and a central aperture operatively disposed therethrough, and said float rod having a lower end portion adapted for passing through said aperture and means for securing said float member to said float rod on both the top and bottom surfaces of said float member in a sandwich-type configuration for insuring that said float road moves reciprocally up and down with said float member.

4. The improved water cooling tower system of claim 2 wherein said means responsive to the position of said float means within said float chamber or generating said "ADD WATER" and said "DON'T ADD" signals, respectively, includes:

magnetic toggle means operatively coupled to an intermediate portion of said float rod for movement therewith, said magnet toggle means including means responsive to said float member having fallen a first predetermined distance below said predetermined desired water level for switching to a first steady state toggle position, means responsive to said float member having risen said second predetermined distance above said predetermined desired water level for switching to a second steady state toggle position, and magnetic means for preventing switching from said second steady state position to said first steady state toggle position until after said monitored water level has fallen at least said first predetermined distance below said predetermined desired water level and for preventing switching from said first steady state position to said second steady state toggle position until said monitored water level has risen at least said second predetermined distance above said predetermined desired water level; and said air valve means for generating said "ADD WATER" signal and said "DON'T ADD" signals includes means responsive to said magnetic toggle means being in said first steady state position for generating said "ADD WATER" signal and being responsive to said magnetic toggle means being in said second steady state position for generating said "DON'T ADD" signal.

5. The improved water cooling tower system of claim 4 wherein said magnetic toggle means includes:

a lever member having a short lever arm, a long lever arm, a top, a bottom, a distal end at one end of said long lever arm, an intermediate central portion, an aperture operatively disposed through said intermediate central portion for receiving an intermediate portion of said float rod therethrough, a lift-up member operatively secured to said float rod below said intermediate central portion of said lever for lifting up the long lever arm and lowering the short lever arm when said float member detects said predetermined desired water level while the water level is rising, a pull-down member operatively secured to said float rod above said intermediate central portion of said lever for pulling down the long lever arm and lifting up the short lever arm when said float member detects said predetermined desired water level while the water level is falling;

a lever housing including an inverted, generally squared, U-shaped channel having a pair of oppositely spaced apart longitudinal sides, opposite ends, a closed top, and an opened bottom, said lever member being operatively mounted within said channel for movement into and out of said open bottom and said channel, a pivot means operatively secured between the spaced apart sides of said lever housing and through said lever at the junction of said short lever arm with said long lever arm for forming the pivot point of said lever, and an aperture operatively disposed in the top of said lever housing for receiving the intermediate portion of said float rod freely therethrough;

a first magnet having a first magnetic polarity operatively coupled to the distal end of said long lever arm;

a second magnet having a second opposite magnetic polarity operatively coupled to the interior channel-facing surface of one end of the lever housing for positioning said first and second magnets adjacent one another and in a repelling orientation such as said first magnet will not move past said second magnet as the long lever arm is raised and lowered through said predetermined desired water level until said first and second predetermined distances past said predetermined desired water level have been achieved to prevent oscillations in said make-up valve means;

lever contact means operatively mounted on the top surface of said short lever arm for movement therewith; and means responsive to said magnetic toggle means having switched to a position wherein the long lever arm carrying said first magnet on its distal end is positioned above the fixedly-mounted second magnet for defining said second steady state toggle position and responsive to said magnetic toggle means having switched to a position wherein the long lever arm carrying said first magnet on its distal end is positioned below the fixedly-mounted second magnetic for defining said first steady state toggle position.

6. The improved water cooling tower system of claim 5 wherein said air valve means includes:

a valve body having a centrally hollow channel therethrough, an outlet at the lower end of said channel, an inlet at the upper end of said channel, a tapered shoulder disposed at an intermediate portion of said channel;

a valve plug having a top end, a bottom end, a hollow longitudinal channel therethrough, and an intermediate body portion having a matingly tapered shoulder portion adapted to sealably engage said tapered shoulder of said channel, said valve plug being operatively mounted within said intermediate portion of said channel for sealing said hollow channel;

an elongated pin means operatively mounted through the hollow longitudinal channel of said valve plug, said pin means being normally spring-biased with a contact at one end disposed out of said channel outlet and it's opposite end extending out the top inlet, said extended top portion carrying a closure member normally seated on the inlet of said hollow longitudinal channel for sealing same said pin means being disposed for reciprocal up and down movement within said hollow longitudinal channel along the longitudinal axis of said valve body, said pin means being responsive to movement by said lever contact means on the top of said short lever arm for raising said pin means to unseat said closure and open said channel for generating said "DON'T ADD" signal when said long lever arm is in said second stable state position above said second fixedly-positioned magnet and for enabling the lowering of said pin means to close said channel and generate said "ADD WATER" signal when said long lever arm is in said first stable state position below said second fixedly positioned magnet.

7. The improved water cooling tower system of claim 5 wherein said lift-up member and said pull-down member form the opposite spaced-apart sides of a sideways-oriented, generally squared, U-shaped member;

wherein said float rod is externally threaded; and wherein said opposite sides of said sideways-oriented U-shaped member include apertures including threads for threadedly engaging the intermediate portion of said float rod extending therethrough.

8. The improved water cooling tower system of claim 7 further including means operatively coupled to the top end portion of said externally-threaded float rod for manually turning said rod to adjust the water level at which the first and second magnets toggle by adjusting the distance between said float means and said lift-up and pull-down members.

9. The improved water cooling tower system of claim 5 including manually-adjustable means for limiting the upward motion of said long lever arm to prevent contact with the top of said lever housing.

10. The improved water cooling tower system of claim 5 further including means operatively coupled to said lever housing for limiting the downward distance said long lever arm can travel.

11. A system for monitoring the liquid level in a reservoir having a predetermined desired liquid level and for controlling the supply of make-up liquid thereto for generally maintaining a predetermined desired liquid level within said reservoir, said system comprising:

a float housing having a hollow interior adapted to be coupled to an air spaced at one end of said reservoir and adapted to be coupled to said liquid at the other end of said reservoir such that the monitored liquid level within said float housing is indicative of the actual liquid level in said reservoir;

float means operatively mounted within said float housing for vertical up and down motion along the longitudinal axis thereof with the rising and falling of the monitored liquid level therein, respectively, for indirectly monitoring the actual liquid level in said liquid reservoir by directly monitoring the liquid level within said float housing and for generating a first position signal whenever said monitored liquid level has fallen at least a first predetermined distance below said predetermined desired liquid level and for generating a second position signal whenever said monitored liquid level has risen at least a second predetermined distance above said predetermined desired liquid level, and for continuing to generate said position signals while in transition therebetween as the monitored liquid level falls and rises through said predetermined desired liquid level;

lever means operatively disposed within said float housing and responsive to said first position signal for magnetically toggling to a first steady state position and responsive to said second position signal for magnetically toggling to a second steady state position;

means operatively coupling said float means to said lever means for positioning said lever means in said first and second steady state positions in response to the falling and rising of the monitored liquid level within said float housing, respectively;

air valve means being in direct communication with said air space and responsive to said lever means being in said first steady state position for generating a first control signal and to said lever means being in said second steady state position for generating a second control signal for controlling said make-up liquid;

conduit means for operatively coupling a source of liquid to said reservoir;

a control signal-responsive hydraulic valve means operatively disposed within said conduit means and responsive to said first control signal for opening to supply said make-up liquid to said reservoir and being further responsive to said second control signal for closing to terminate the supply of said make-up liquid to said reservoir.

12. The system of claim 11 wherein said float housing includes:

a right cylindrical, longitudinally-disposed wall defining a hollow interior;
a closed bottom;
a top;
a liquid inlet through said wall adjacent said closed bottom;
an air inlet through said wall adjacent said top;
first conduit means for coupling the atmosphere existing above the liquid in said reservoir to said air inlet; and
second conduit means for coupling the liquid in said reservoir to said liquid inlet, said coupling being at a location at least a given distance below said predetermined desired liquid level of said reservoir so that the monitored liquid level in said float housing is indicative of the actual liquid level within said reservoir.

13. The system of claim 12 wherein said liquid includes fresh water.

14. The system of claim 12 wherein said float means includes a circular, disk-like float member having a right cylindrical body configuration and a diagonal dimension adapted to permit said float member to have it's annular peripheral edge disposed adjacent to and a predetermined distance from the interior cylindrical wall of said float housing to enable said float member to rise and fall vertically therein as the monitored liquid level rises and falls, respectively.

15. The system of claim 14 wherein said float member includes a plastic foam means which is relatively buoyant and which will not absorb significant amounts of said liquid.

16. The system of claim 15 wherein said liquid includes fresh water.

17. The system of claim 11 wherein said lever means includes:
a lever housing fixedly secured within the hollow interior of said float housing;
a lever member pivotally mounted within said lever housing, said lever member having a long lever arm and a short lever arm separated by a pivot pin;
a first magnet having a first magnetic polarity operatively mounted on the free distal end of said long lever arm;
a second magnet having a second and opposite magnetic polarity operatively fixedly mounted on a corresponding end of said lever housing;
said first and second magnets being operatively disposed so that their magnetic fields repel one another away from an aligned position and into one of said first and second steady state positions;
aperture means operatively disposed through a central portion of said lever member and through a central portion of said lever housing;
a vertically extending float road having a lower end portion operatively secured to the central portion of said float member, an intermediate portion passing through said aperture means, and a upper end portion extending above said lever housing;
means operatively mounted to the intermediate portion of said float road for vertically up and down movement therewith for operatively engaging said long lever arm and pivoting said lever member to raise and lower same between said first and second steady state positions;
said long lever arm being unable to toggle past an intermediate position wherein the axis of said first and second repelling magnets are aligned until said float means has fallen or risen at least said first and second predetermined distance below and above said predetermined desired liquid level, respectively.

18. The system claim 17 wherein said air valve means for generating a control signal includes:
a valve body including a hollow central channel extending longitudinally therethrough, a channel inlet, a channel outlet, and an intermediate tapered shoulder within said hollow central channel;
a valve closure member including an intermediate, matchingly-tapered body portion adapted to operatively engage the tapered shoulder of said hollow central channel for sealably closing same, said valve closure member being operatively mounted within said hollow central channel, said valve closure including a hollow longitudinal passage therethrough, a passage inlet having a seat;
a reciprocating pin-like slide member operatively mounted at least partially within said hollow central channel and through said hollow longitudinal passage through said valve closure member and including a bottom portion extending from the outlet of said channel, and having a contact member at the distal end thereof and a top portion extending out of the inlet of said hollow longitudinal passage and carrying a seat seal for selectively opening and closing said inlet to said passage said pin-like slide member being normally biased in a position for maintaining said seat seal closed on said passage inlet and said contact end extended outwardly from said passage outlet, said pin-like slide member being upwardly positionable into said hollow passage for moving said seat seal of said seat to open said passage, said first control signal being generated when said open seat seal is lifted off of the seat at the inlet so that the passage is and said second control signal being generated when said seat seal is seated on the passage inlet and said passage is closed;
air signal conduit means operatively coupling the inlet of said valve body to the control port of said signal-responsive make-up supply valve means for controlling the operation thereof; and
a contact member operatively disposed on top of the short lever arm and being positionable so as not to contact the downwardly extended end of said pin-like slide member for enabling said passage to remain closed and said second control signal to be generated, said contact member being responsive to said long lever arm toggling to said first steady state position for contacting, the downwardly extended end portion of said pin-like slide member and raising said seat seal to open said hollow central passage and generate said first control signal in response thereto.

19. The system of claim 12 wherein said lever means includes:
a lever housing fixedly secured within the hollow interior of said float housing;
a lever member pivotally mounted within said lever housing, said lever member having a long lever arm and a short lever arm separated by a pivot pin;
a first magnet having a first magnetic polarity operatively mounted on the distal end of said long lever arm;

a second magnet having a second and opposite magnetic polarity operatively mounted on the corresponding end of said lever housing;

said first and second magnets being operatively disposed so as to repel one another away from an aligned position and into one of said first and second steady state positions;

aperture means operatively disposed through a central portion of said lever member and through a central portion of said lever housing;

a vertically extending float rod having a lower end portion operatively secured to the central portion of said float member, an intermediate portion passing through said aperture means, and a upper end portion extending above said lever housing;

means operatively mounted to the intermediate portion of said float rod for vertical up and down movement therewith for operatively engaging said long levr arm and pivoting said lever member to raise and lower same between said first and second steady state positions;

said long lever arm being unable to toggle past the intermediate position wherein said first and second repelling magnets are aligned until said float means has fallen or risen at least said first and second predetermined distance below and above said predetermined desired liquid level, respectively.

20. The system of claim 19 wherein said air valve means for generating a control signal includes:

a valve body including a hollow central channel extending longitudinally therethrough, a channel inlet, a channel outlet, and an intermediate tapered shoulder within said hollow central channel;

a valve closure member including an intermediate, tapered body portion adapted to operatively engage the tapered shoulder of said hollow central channel for sealably closing same, said valve closure member being operatively mounted within said hollow central channel for closing some and including a longitudinal passage therethrough, the top inlet end of said passage having a seat about the passage inlet and having a passage outlet;

a slide member operatively mounted at least partially within said hollow central channel and through said longitudinal passage, said slide member including a top portion extending from said passage inlet, a bottom portion extending downwardly from said passage outlet, said bottom portion having a contact member on its distal end and said top portion mounting a passage closure member, said slide member downwardly for seating said closure member on said passage inlet for sealing said passage to generate said second control signal, said slide member being positionable upwardly into said hollow passage channel for lifting said closure member off of said seat and opening the passage inlet for generating said first control signal;

air signal conduit means operatively coupling the inlet of said passage of said valve body to the control port of said signal-responsive make-up valve means for controlling the operation thereof; and a contact member operatively disposed on top of the short lever arm and normally being positioned so as not to contact the extended end of said slide member when said long lever arm is toggled to said second steady state position for enabling said passage to remain sealed and said second control signal to be generated, said contact member being responsive to said long lever arm toggling to said first steady state position for contacting the downwardly extended end portion of said slide member and raising said passage closure member to seal said hollow passage and generate said first control signal in response thereto.

21. The system of claim 20 wherein said lever housing includes a generally inverted, U-shaped member having a pair of downwardly distending longitudinal sides spaced a predetermined space apart from one another and a longitudinal top operatively connecting the top edge of each of said longitudinal sides for forming a hollow open-ended channel therebetween;

said channel having an open bottom and closed ends;

said lever member being operatively mounted within said channel and being pivotally mounted therein by a pivot pin passing through the downwardly distending sides of said lever housing at the junction of said short lever arm with said long lever arm;

said long lever arm passing upwardly into said channel when in said second steady state position and downwardly out the open bottom of said channel when in said first steady state position; and a generally squared, C-shaped contact member having a top horizontal leg spaced a predetermined distance from a bottom horizontal leg and interconnected by a side member for forming a substantially hollow interior therebetween, said contact member being adjustably secured to an intermediate portion of said float rod for vertical up and down moment therewith, said top leg contacting the top of said lever member when said water level is falling for pulling it into said first steady state position and said second leg contacting said lever member from below for pushing it up into said second steady state position as the water rises.

22. The system of claim 21 wherein said vertically extending float rod is externally-threaded and wherein said upper and lower horizontal legs of said contact member include internally-threaded apertures extending therethrough for threadedly engaging the intermediate portion of said float rod to insure the movement of said contact member therewith.

23. The system of claim 22 wherein said float rod further includes a manually operable adjustment means operatively disposed on the top portion thereof for adjusting the position of said contact member therealong so as to adjust the distance between said lever member and said float member, as desired.

24. The system of claim 23 further including a first manually-adjustable limit means for preventing the long lever arm from contacting the top of the lever housing.

25. The system of claim 24 further including a second limit means for preventing the long lever arm from extending more than a predetermined distance out of the open bottom of said lever housing.

26. The system of claim 25 wherein said liquid includes fresh water.

27. An apparatus for monitoring the level of a liquid in a liquid-retaining reservoir having a predetermined desired liquid level for controlling the input of fresh liquid thereto for maintaining said predetermined desired liquid level, said apparatus comprising, in combination:

a source of fresh liquid;

a conduit means operatively coupling said source of fresh liquid to said reservoir;

a control signal-responsive valve means operatively disposed in said conduit means and having a control signal port, said signal-responsive valve means being responsive to a first control signal at said control signal port for opening to supply said fresh liquid to said reservoir and being further responsive to a second control signal at said control signal port for closing to terminate the supply of fresh liquid to said reservoir;

a float housing having a closed bottom and water level equalizing means for coupling said float housing to said reservoir such that the level of liquid in said float housing is indicative of the actual level of liquid in said reservoir;

a float member operatively mounted for up and down motion in said float housing for monitoring the level of liquid therein;

a vertically-oriented float rod operatively connected to a center portion of said float member for rising and falling with said float member;

a lever housing operatively mounted within said float housing;

a lever member operatively mounted within said lever housing and including an elongated pivot member pivotedly mounted within said lever housing, said lever member having a long lever arm on one side of said pivot point and a short lever arm on the opposite side of said pivot point;

a first magnet having a first magnetic polarity operatively mounted on the distal end of said long lever arm for movement therewith;

a second magnet having a second opposite magnetic polarity operatively mounted to one end of said float housing adjacent the distal end of said long lever arm such that said magnetic fields of said first and second magnets repel one another when they approach a longitudinally aligned face-to-face orientation;

lever control means adjustably connected to an intermediate portion of said float rod for vertical up and down motion therewith, said control means having a first member operably positioned above a central portion of said long lever arm for pulling said long lever arm down until it toggles to a first steady state position and a second contact member operably positioned below a portion of said long lever arm for lifting same until it toggles to a second steady state position, said lever member remaining in its previous steady state position even as the float rises and falls said first and second predetermined distances above and below said predetermined desired liquid level until the force required to toggle said first magnet past said second magnet has been developed thereby preventing oscillations about said predetermined desired liquid level; and a control signal-generating valve means responsive to the first steady state position of said lever member for generating said first control signal and for maintaining the generation of said first control signal until said float member has risen to a level corresponding to said second predetermined distance above said predetermined desired liquid level when it has overcome the repulsion force of said opposed magnets to toggle said lever member to said second steady state position, said control signal-generating means being further responsive to the second steady state position of said lever member for generating said second control signal and for maintaining the generation of said second control signal until the float member has fallen to a level corresponding to said first predetermined distance below said predetermined desired liquid level when it has overcome the repulsion of said opposed magnets to toggle said lever means to said first steady state position.

28. The combination of claim 27 wherein said float housing includes:
a right cylindrical, longitudinally-disposed wall defining a hollow interior;
a closed bottom;
a top;
a liquid equalization inlet through said wall adjacent said closed bottom;
an air equalization inlet through said wall adjacent said top;
first conduit means for coupling the atmosphere existing above the liquid in said reservoir to said air inlet; and
second conduit means for coupling the liquid in said reservoir to said liquid inlet, said coupling being at a location at least a given distance below said predetermined desired liquid level of said reservoir so that the monitored liquid level in said float housing corresponds to the actual liquid level within said reservoir.

29. The combination of claim 28 wherein said float means includes a circular, disk-like float member having a right cylindrical body configuration and a diagonal dimension adapted to permit said float member to have it's annular peripheral edge disposed adjacent to and a predetermined distance from the interior cylindrical wall of said float housing to enable said float member to rise and fall vertically therein as the monitored liquid level rises and falls, respectively.

30. The combination of claim 29 further including:
aperture means operatively disposed through a central portion of said lever member and through a central portion of said lever housing;
a vertically extending float rod having a lower end portion operatively secured to a central portion of said float member, an intermediate portion passing through said aperture means, and a upper end portion extending above said lever housing;
means operatively mounted to the intermediate portion of said float rod for vertical up and down movement therewith for operatively engaging said long lever arm and pivoting said lever member to raise and lower same between said first and second steady state positions;
said long lever arm being unable to toggle past the intermediate position wherein the axis of said first and second repelling magnets are aligned until said float means has fallen or risen at least said first and second predetermined distance below and above said predetermined desired liquid level, respectively.

31. An apparatus for monitoring the level of a liquid in a reservoir having a predetermined desired liquid level and for generating a first control signal for controlling the addition of liquid to said reservoir and a second control signal for terminating the addition of liquid to said reservoir from a supply valve means, said apparatus comprising:
a float chamber;
means for operatively coupling a bottom portion of said float chamber to said reservoir such that the level of liquid within said float chamber is equivalent to the level of liquid in said reservoir;

a float member operatively positioned within said float chamber for rising and falling with the monitored liquid level therein;

an elongated, vertically-oriented float rod having a bottom portion connected to a central portion of said float member for movement therewith, a top portion, and an intermediate portion therebetween;

a lever housing fixedly secured at an intermediate portion within said float chamber;

a lever member pivotly mounted within said lever housing and having a long lever arm and a short lever arm;

a first magnet having a first magnetic polarity operatively mounted to the distal end of said long lever arm for pivotal movement therewith;

a second magnet having a second opposite magnetic polarity operably mounted to the end of said lever housing adjacent to but spaced apart from said distal end of said long lever arm;

said opposite polarity magnets having their magnetic fields oriented to repel each other when aligned;

first means operatively carried by an intermediate portion of said float rod for lowering said long lever arm past said position of magnetic alignment to a first steady state position;

second means operatively carried by an intermediate portion of said float rod for raising said long lever arm past said position of magnetic alignment to a second steady state position;

the force required to overcome said magnetic repulsion and toggle said long lever arm past said position of magnetic alignment being equivalent to that force required to further lower and further lift said float member said first and second predetermined distances past said predetermined desired liquid level, respectively; and means responsive to said long lever arm being in said first steady state position for generating said first control signal and to said long lever arm being in said second steady state position for generating said second control signal for operating said supply valve means.

* * * * *